United States Patent [19]

Lasis et al.

[11] 3,969,330

[45] July 13, 1976

[54] AMINE MODIFIED POLYMERS

[75] Inventors: Evalds Lasis; Ernest Jack Buckler, both of Sarnia, Canada

[73] Assignee: Polysar Limited, Sarnia, Canada

[22] Filed: Sept. 30, 1974

[21] Appl. No.: 510,725

[30] Foreign Application Priority Data

Nov. 8, 1973   Canada .................................. 185359

[52] U.S. Cl. .................................... 526/14; 526/23; 526/42

[51] Int. Cl.² ................. C08F 236/06; C08C 19/12; C08C 19/18

[58] Field of Search ................ 260/78.5 BB, 78.5 B, 260/78.5 T, 80.3 N, 80.7, 82.1, 82.3, 83.3, 85.1, 85.3 H, 83.5

[56] References Cited
UNITED STATES PATENTS

| | | | |
|---|---|---|---|
| 2,965,594 | 12/1960 | Maeder | 260/29.6 |
| 3,011,996 | 12/1961 | Kuntz et al. | 260/41.5 |
| 3,178,398 | 4/1965 | Strobel et al. | 260/85.1 |
| 3,527,744 | 9/1970 | Baker et al. | 260/80.78 |

*Primary Examiner*—John Kight, III
*Attorney, Agent, or Firm*—Stevens, Davis, Miller & Mosher

[57] ABSTRACT

Synthetic rubber compositions of improved green strength are prepared by incorporating in a synthetic rubber polymer, such as NBR or SBR, a small number of tertiary amine groups, and reacting this polymer with a halogen compound containing two or more halogen atoms capable of forming quarternary ammonium salts with the tertiary amine groups on the polymer. 1,4-dibromobutene-2 is a suitable halogen compound. The tertiary amine groups can be incorporated by copolymerizing dimethylaminoethyl acrylate with the rubbery copolymer forming monomers.

14 Claims, No Drawings

AMINE MODIFIED POLYMERS

This invention relates to synthetic rubber compositions useful for the manufacture of rubber goods and to processes for preparing such compositions.

The types of synthetic rubbers commonly used for making tires are styrene-butadiene copolymers in which butadiene predominates (SBR rubbers), polyisoprene and polybutadiene, and mixtures thereof. Whilst these polymers possess most of the desirable properties of a tire tread rubber, they are deficient in green strength. Green strength is a term applied to denote the strength, cohesiveness and dimensional stability of rubber compounds before they are cured or vulcanized. The lack of green strength of SBR, compared with that of natural rubber, is well known, and it has become a more acute problem with the advent of tires such as radial tires, in the manufacture of which the uncured (green) rubber composition has to withstand deformations of up to about 200% elongation without necking or uneven flow, and without rupture. Heretofore it has been common to provide the necessary green strength by mixing natural rubber with the synthetic rubber in the rubber composition.

Nitrile rubbers are also deficient in green strength. These rubbers, which are generally copolymers of butadiene (major proportion) and acrylonitrile, are oil resistant and are used in the manufacture of mechanical rubber goods, such as hose pipes and conveyor belting. In processing nitrile rubber compounds, lack of green strength can create problems, and it has generally been found necessary to use nitrile rubbers of high Mooney for making mechanical goods, so as to avoid these problems. It would be advantageous to be able to use lower Mooney nitrile rubbers with improved green strength.

The present invention provides synthetic rubber compositions of improved green strength. These compositions comprise a rubbery polymer of a $C_4$–$C_6$ conjugated diolefin (e.g. butadiene) or a rubbery copolymer thereof with a $C_8$–$C_{10}$ vinyl or vinylidene substituted aromatic hydrocarbon (e.g. styrene) or with a $C_3$–$C_5$ vinyl compound containing a nitrile group (e.g. acrylonitrile), having from about 0.5 millimoles to about 10 millimoles per 100 grams of copolymer of bound tertiary amine groups in the polymer molecule, the polymer or copolymer having been reacted with a halogen containing organo compound as hereinafter defined. Compositions of such reacted polymers and conventional rubber compounding ingredients have the required green strength for use in radial tire manufacture without the necessity of blending in any natural rubber, and for use in manufacture of hose pipe without resorting to the use of high Mooney polymers. The other known properties of the polymers are not significantly affected. Also, the factory processability of the compounds is essentially retained.

Examples of suitable conjugated diolefin polymers to which the present invention is applicable include polybutadiene, polyisoprene, and rubbery copolymers of at least one conjugated diolefin selected from butadiene - 1,3; isoprene; piperylene; and 2,3-dimethyl-butadiene-1,3; with at least one monomer selected from styrene; α-methyl-styrene; and the vinyl toluenes and from acrylonitrile and methacrylonitrile. The preferred polymers for use in the present invention are rubbery copolymers of butadiene and styrene (SBR) and rubbery copolymers of butadiene and acrylonitrile (NBR), and so further detailed description of the invention will have specific reference to these copolymers.

The preferred rubbery copolymer of butadiene and styrene used in the present invention has a bound butadiene content of from 60–85 by weight, and a bound styrene content of from 40–15% by weight, largely in accordance with normal SBR used in tire and general goods manufacture. The most preferred such copolymers are those having 70–82% by weight bound butadiene content and 30–18% by weight bound styrene content.

The preferred NBR copolymers used in the present invention are rubber copolymers containing from about 50–80% by weight bound butadiene content and from about 20–50% by weight bound acrylonitrile content. These copolymers also are largely in accordance with normal NBR used in mechanical goods manufacture. The most preferred such copolymers are those having from 60–75% by weight bound butadine content and from 25–40% by weight bound acrylonitrile content.

The tertiary amine groups are conveniently introduced by copolymerizing with the butadiene and styrene or acrylonitrile a small amount of a copolymerizable monomer having tertiary amine groups in the molecule, which amine groups are substantially unaffected by the polymerization. Preferably, the amine monomer is one which copolymerizes readily with butadiene and styrene or acrylonitrile in a conventional emulsion polymerization system, and which has a copolymerization reactivity similar to that of the copolymerizing monomers. With such a preferred monomer, a copolymer is obtained with tertiary amine groups distributed along and amongst the polymer chains.

Examples of classes of suitable monomers are:

1. Acrylates and methacrylates of general formula

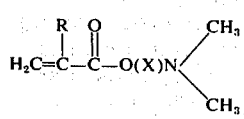

where R represents H or $CH_3$, and x represents an aliphatic hydrocarbon group of 2–4 carbon atoms or a secondary or tertiary amine substituted aliphatic hydrocarbon of 2–4 carbon atoms. Specific preferred members of this class are dimethylaminoethyl acrylate and dimethylaminoethyl methacrylate.

2. Amino alkyl esters of unsaturated dibasic acid, e.g.

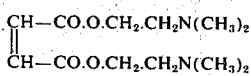

3. Dimethyl aminoalkylthiol esters of methacrylic acid and dimethyl aminoalkylthioethyl esters of acrylic and methacrylic acids, e.g. dimethylaminothioethyl acrylate,

4. Dimethyl tertiary amino alkyl substituted conjugated diolefine of 4–8 carbon atoms, for example 2-dimethylaminomethyl butadiene -1, 3,

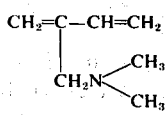

The copolymer is conveniently produced by aqueous emulsion polymerization, in accordance with normal methods, i.e. at a pH of 7–11 using a free radical initiator system. The distribution of the tertiary amine groups along and among the polymer molecules can be influenced by the means of addition to the polymerization system of the amine group containing monomer. The amine monomer may be added together with the other polymerizable monomers, before the polymerization is started in which case the amine groups tend to be concentrated in the lower molecular weight polymer molecules. The amine monomer may be added toward the end of the polymerization of the other monomers in which case the amine groups tend to be found in the higher molecular weight polymer molecules. The amine monomer may be added incrementally during the polymerization whereby the amine groups tend to be randomly distributed along and between the polymer molecules, this generally being the preferred method of addition.

After polymerization, the copolymer is reacted with a halogen containing organo compound. Whilst reaction can take place at the latex stage, by adding the halogen compound to the latex after polymerization, best results are obtained when the copolymer is recovered from the latex in the conventional way, and then reacted subsequently with the halogen compound. The halogen compound may be added at any suitable stage following recovery from the latex, including during the drying of the rubber or during a milling operation in the process of preparing the rubber for packaging. Alternatively, the halogen compound may be added to the polymer along with the other compounding ingredients, e.g. on a rubber mill or in an internal mixer.

The halogen containing organo compounds are compounds containing two or more halogen atoms capable of forming quaternary ammonium salts with the tertiary amine groups of the polymer. The halogen compounds are preferably activated dihalo compounds wherein the halogen groups are activated by an adjacent grouping such as a carbon-carbon double bond, an aromatic nucleus or an electron donor group, such as a carbonyl or carboxylic acid group, wherein the halogen is selected from chlorine, bromine and iodine. Most preferred halogen compounds are the activated dibromo compounds. Examples of suitable halogen containing organo compounds are 1, 4-dibromobutene -2 and 1,4-dichlorobutene-2 and the higher molecular weight homologues; $\alpha,\alpha'$-dibromo-xylenes; $\alpha,\alpha'$-dichloro-xylenes; liquid dibromopolybutadiene having bound allylic bromide groups; dibromosorbic acid $CH_3$-CHBr—CH=CH—CHBr—COOH, which is prepared by direct bromination of sorbic acid; alkali metal salts of dibromosorbic acid; and other halogenated polymers including partially brominated polyisoprene or mixtures thereof. When dibromopolybutadiene is used, it is preferably of low molecular weight, e.g. in the range 200–5000, and preferably in the range 800–2000.

The theoretical basis of the present invention has been tentatively established only, and it is not intended that the invention should be limited by any theoretical considerations. It appears that the tertiary amine groups on the copolymer react with halogen groups on the polyhalo compound to form some kind of labile bonds, associations or crosslinks between the polymer chains. This "labile crosslinking" is responsible for the increase in green strength of the compounds. However, on processing the rubber compounds, e.g. on mixing, milling, extruding, etc., these labile crosslinks are broken, perhaps due to the high shearing and/or the temperatures encountered in such operations, so that the rubber compound based on the copolymer processes as a normal polymer, even though the temperatures encountered are well below those normally required to cause the decomposition of more simple but comparable low molecular weight compounds. These labile crosslinks appear to be reversible, so that when the compound cools down again after processing, the labile crosslinks re-form and the high green strength of the compound is recovered. They are thus different in chemical nature and stability from crosslinks formed on curing the rubber, e.g. with sulphur and accelerators, which are chemically much stronger and essentially irreversible.

In accordance with this theoretical explanation, it has been found that the types of groups attached to the polymer chain and the types of groups on the halogen compound which react therewith are important. Thus it is necessary that the polymer have tertiary amine groups attached thereto, and that these react with halogen groups, especially bromide or chloride groups, to form quaternary ammonium salts. It also appears that lower molecular weight halogen compounds form labile crosslinks more quickly than higher molecular weight compounds. Dichloro compounds are less satisfactory reactants than dibromo compounds, since the compounds formed with the chlorinated compounds, such as $\alpha$, $\alpha'$-dichloro-p-xylene and 1,4-dichlorobutene-2, develop less green strength in a given time than those formed with the corresponding dibromo compounds.

Also in accordance with this theoretical explanation, the amounts of tertiary amine groups in the polymer and halogen compound reactant, in relation to each other and to the overall amount of polymer, are important. It is desirable to have an approximate chemical equivalence of tertiary amine groups and halogen groups on the halogen compound. However, one can if desired use a polymer containing a large amount of bound tertiary amine groups, and use only the small amount of halogen compound required to give the necessary amount of "labile cross-links" for the improved green strength required. By having present a known excess of tertiary amine groups in the polymer, one can then control the desired green strength by adding different amounts of halogen compound. On grounds of economy in the use of tertiary amine monomer and halogen compound, however, large excesses of either material should be avoided. Preferred amounts of the halogen compound are such that it contains at least 0.1 and not more than 10 millimoles of halogen groups per 100g of polymer and the most preferred amount of the halogen compound is that which contains from 1 to 5 millimoles of halogen groups per 100g of polymer.

The rate at which the labile crosslinks are formed appears to vary, depending upon a number of factors, amongst which are the precise nature of the halogen compound and the conditions under which it is reacted with the polymer. In some cases the crosslinks appear to form almost instantaneously, e.g. in the case where a tertiary amine group containing SBR is reacted at 140°–165°F with dibromobutene-2. Such instantaneous reaction is not essential, however. The procedures of reacting the polymer and halogen compound and subsequent processing and utilization of the rubber compound where the high green strength is required should be chosen with a view to allowing whatever time is necessary for the formation of the labile crosslinks under the specific circumstances. Also, because the crosslinks are not always instantaneously formed, measurements of green strength of the compounds may give different results depending upon when they are taken.

The amount of tertiary amine groups on the polymers is relatively small, in the range of from about 0.5 millimoles to about 10 millimoles, preferably from about 0.75 millimoles to about 7.5 millimoles and most preferably from about 1 to about 5 millimoles, of tertiary amine groups per 100 gms. copolymer. The minimum is dictated by the requirement that satisfactory green strength be achieved in the rubber composition, by the formation of at least a minimum number of labile crosslinks. The maximum amount is somewhat more flexible. However, it is necessary to ensure that too many labile crosslinks are not formed, otherwise the Mooney viscosity of the rubber composition will become so high that the easy factory processability of the compound necessary is lost.

With specific preferred copolymerizable amine monomers and polyhalo compounds, the suitable amounts can be expressed on a weight basis. With the preferred monomer dimethylaminoethyl methacrylate, it is preferred to use from about 0.1 to about 1.2 parts by weight per 100 parts by weight of copolymer. Copolymers containing such amounts of dimethylaminoethyl methacrylate are suitably reacted with from about 0.02 to about 1.5 parts by weight, per 100 parts by weight of rubber, of 1,4-dibromobutene-2.

The tertiary amine group containing copolymers used in the present invention are solid elastomeric materials of high molecular weight, preferably having a Mooney viscosity (M/L 4' at 100°C) of about 20 to about 150. They can be milled, extruded or otherwise processed with or without the conventional compounding ingredients, i.e. fillers such as carbon black, clay, silica, calcium carbonate and titanium dioxide, plasticizers and extender oils, tackifiers, antioxidants and vulcanizing agents such as organic peroxides or the well known sulfur systems. The preferred curative is a sulfur vulcanization system which contains a mixture of about 1–5 parts per 100 parts copolymer (phr) of sulfur and about 1–5 phr of one or more accelerators selected from any of the known accelerator classes. Representative examples of such accelerators are an alkyl benzothiazole sulfenamide, a metal salt of a dihydrocarbyl dithiocarbamate, 2-mercapto benzothiazole, 2-mercapto imidazoline. The amounts of filler may vary between about 20 and 150 parts, and extender oil between about 5 and 100 parts, per 100 parts of polymer. The well known compounding and vulcanization technology may be used for these polymers.

In order to prepare a rubber composition suitable for extrusion into a tire tread, a tertiary amine group containing SBR, before or after reaction with the halogen compound, is mixed with carbon black, oil, fillers, curatives, accelerators and the like, substantially in accordance with known rubber compounding procedures. A typical compounding recipe which can be used is:

| | | |
|---|---|---|
| Tertiary amine group containing SBR | 100 | parts by weight |
| Hydrocarbon mineral oil | 37.5 | " |
| HAF carbon black | 50 | " |
| Zinc Oxide | 3.0 | " |
| Stearic acid | 1.0 | " |
| Sulphur | 1.7 | " |
| N-t-butyl-2-benzothiazole sulfenamide | 1.0 | " |

This recipe can be mixed on a mill or in a Banbury mixer, or in two or more stages using a Banbury followed by mill mixing of the curatives. The components added to the mill or mixer may also include the halogen compound. In accordance with known procedures, the hydrocarbon mineral oil and/or the carbon black may be added to the rubber at the latex stage, i.e. after polymerization and prior to coagulation and recovery of the rubber. The reaction with the halogen compound can take place in the presence of oil and carbon black. After thorough mixing in the normal way, the rubber compound can be extruded into a tire tread, applied to a tire carcass and cured. The composition may include a mixture of the SBR copolymer described herein and another synthetic rubber such as polybutadiene, and the improved green strength properties are observed.

From the viewpoint of green strength, the best rubber compositions are those of which the behaviour on subjecting to stress in the uncured state is similar to that of compositions based on natural rubber. If one measures the stress required to cause increasing amounts of elongation in natural rubber green compounds, (i.e. a stress/strain curve) at room temperature, one finds in general that the stress is greater the greater the elongation, all the way up to rupture of the specimen. In other words, the stress-strain curve has a generally positive slope at all places. The shape of the curve changes somewhat at elevated temperatures, in that the curve may pass through a maximum and be followed by small negative slopes. The stress/strain curves of conventional SBR and NBR have a different shape. The curves for conventional SBR reach a maximum stress value, at around 60–80% elongation, and then have a fairly large negative slope. A large negative slope indicates severe weakness in the composition at the corresponding elongation value, and risk of rupture. Thus, it is desirable that the rubber composition used for building tires, hose pipe and the like, where it has to withstand substantial elongations in the uncured, green state, have a green stress-strain behaviour similar to that of natural rubber compositions. Negative slopes are tolerable providing these slopes are small.

In connection with compounds of the present invention, this tolerable green strength behaviour is conveniently expressed on the basis of the relative change in modulus (i.e. extending force) in causing extension of the green compound from 100% extension to 200% extension. A negative value for this change indicates a negative slope on the stress-strain curve between these extensions. Specifically, it has been found when the change in modulus value $$\Delta M = \frac{200\% \text{ modulus} - 100\% \text{ modulus}}{100\% \text{ modulus}}$$

expressed as a percentage is no less than −10%, and preferably from −5% to +15%, a compound of satisfactory green strength is obtained. This criterion is not met by conventional SBR compositions. It is met by natural rubber compositions. It is met by compositions of the present invention. In addition, rubber compositions of satisfactory green strength have a green elongation at break of at least 250%.

It has also been found that the compounds of the present invention can be readily converted to powdered rubbers. Using conventional methods, an acrylonitrilebutadiene-type rubber of the present invention was found to be readily grindable to yield the rubber in the form of powdered particles of about one-eighth inch length.

The invention is further illustrated in the following specific examples.

EXAMPLE 1

Copolymers were prepared by polymerizing a monomer mixture of 71 parts by weight of butadiene - 1,3, 28 parts by weight of styrene and different amounts, between 0.3 and 0.7 parts by weight of dimethylaminoethyl methacrylate, in the following manner. The monomer mixture was emulsified in a stirred 40 gallon reactor, in 185 parts by weight of a 3% aqueous solution of a sodium rosin acid. The polymerization reaction was carried out at about 7°C in the presence of a redox catalyst, to about 60% conversion. After stripping off the residual monomers, 37.5 parts by weight of hydrocarbon mineral oil, per 100 parts by weight of rubber, was added to two of the latex samples. All of the latices were coagulated and dried to provide solid rubbery polymers.

Infra-red analysis showed Rubber A to contain 0.30 weight percent, Rubber B to contain 0.34 weight percent and Rubber C to contain 0.77 weight percent, tertiary amine groups, based on copolymer. Rubber A had a Mooney viscosity (ML-4' at 100°C) of about 53. Rubber B had a Mooney viscosity (ML-4') of about 63. Rubber C had a Mooney viscosity (ML-4') of about 83 and contained no oil. Samples of Rubbers A,B and C and a control Rubber D, a conventional SBR containing no amine but prepared and oil extended as previously described, and having a 77/23 butadiene/styrene ratio by weight, and a Mooney (M1-4) of 50, were compounded on a laboratory mill using the following recipe, in parts by weight:

| Rubber | 100 |
|---|---|
| High Abrasion Furnace Carbon Black (HAF) | 50 |
| Zinc Oxide | 3.0 |
| Stearic Acid | 1.0 |
| N-t-butyl-2-benzothiazol sulfenamide | 1.0 |
| Sulfur | 1.75 |
| 1,4-Dibromobutene-2 | Variable |

All the compounds processed well on a rubber mill at about 70°C. The compounds were tested in the unvulcanized (green) state for stress-strain properties at room temperature in an Instron (trade mark) tester, at a jaw separation rate of 50 cm per min. The compound details and results are shown in Table 1.

TABLE 1

| Sample Reference No. | 1 | 2 | 3 | 4 |
|---|---|---|---|---|
| Rubber | A | B | C | D |
| Tertiary amine group content (wt.% copolymer) | 0.3 | 0.34 | 0.77 | — |
| 1,4-Dibromobutene-2 (parts by wt. per 100 copolymer + oil) | 0.1 | 0.1 | 0.15 | — |
| 100% modulus (kg/cm²) | 3.6 | 2.7 | 7.5 | 3.0 |
| 200% modulus (kg/cm²) | 4.2 | 3.1 | 8.7 | 2.6 |
| ΔM (%) | +16.7 | +12.9 | +13.8 | −13.3 |
| Elongation at break (%) | 720 | 900 | 490 | 390 |
| Tensle strength at break (kg/cm²) | 5.4 | 2.4 | 10.9 | 1.8 |

EXAMPLE 2

Further samples of the oil extended rubbers described in Example 1 were compounded as aforesaid, but using different bromine or chlorine compounds to form the labile crosslinks. Their green strength was tested as before. The results are given in Table 2.

TABLE 2

| Sample Reference No. | 5 | 6 | 7 | 8 | 9 | 10 |
|---|---|---|---|---|---|---|
| Rubber | A | A | A | B | B | B |
| Tertiaryamine group content(wt.%copolymer) | 0.3 | 0.3 | 0.3 | 0.34 | 0.34 | 0.34 |
| α,α'-dibromo-p-xylene (pt. by wt.per 100 rubber and oil) | 0.123 | — | 0.025 | — | — | — |
| 1,4-dichlorobutene-2 (pt.by wt.per 100 rubber and oil) | — | 0.075 | — | — | — | — |
| Dibromopolybutadiene (pt.by wt. per 100 rubber and oil) | — | — | 0.25 | — | — | — |
| Dibromosorbic acid (pt.by wt. per 100 rubber and oil) | — | — | — | 0.2 | 0.4 | — |
| Dibromosorbic acid sodium salt (pt.by wt.per 100 rubber and oil) | — | — | — | — | — | 0.4 |
| 100% modulus (Kg/cm²) | 3.4 | 3.4 | 3.4 | 4.0 | 4.8 | 3.8 |
| 200% modulus (Kg/cm²) | 3.6 | 3.3 | 3.45 | 4.6 | 5.8 | 4.4 |
| ΔM (%) | +5.8 | −2.9 | +1.5 | +15 | +20.8 | +15.8 |
| Elongation at break(%) | 660 | 510 | 580 | 710 | 640 | 700 |
| Tensile strength at break(Kg/cm²) | 3.75 | 2.8 | 3.0 | 7.0 | 7.9 | 6.2 |

EXAMPLE 3

A sample of Rubber B described in Example 1, containing 37.5 phr mineral oil and having 0.34 weight percent bound tertiary amine groups, was blended with a solution polymerized polybutadiene (TAKTENE*1203). Equal parts of oil extended Rubber B and the polybutadiene were used, and compounded in the recipe given in Example 1. The recipe included 0.1 parts by weight of 1,4-dibromobutene-2, per 100 parts by weight of Rubber B. The green stress strain properties of this compound were:

| | |
|---|---|
| 100% Modulus (kg/cm²) | 2.8 |
| 200% Modulus (kg/cm²) | 3.4 |
| ΔM (%) | +21.2 |
| % Elongation at break | 380 |
| Tensile strength at break (kg/cm²) | 3.5 |

The presence of a second rubber in admixture with the composition of this invention does not prevent improvement of green strength in the mixture.

*TAKTENE is a Registered Trade Mark.

EXAMPLE 4

In this example, samples of oil extended Rubber A of Example 1 were compounded according to the recipe given in example 1, including various amounts of 1,4-dibromobutene-2 or α,α'-dibromo-xylene, and cured under standard conditions. The vulcanizates were tested, in a comparison with the vulcanizate of control rubber D of Example 1. The results, reported in Table 3, show that the vulcanizate properties are comparable with those of the control.

lar weight about 2,000 were used. Dibromo polybutadiene is a butadiene polymer having essentially two terminal allylic bromine groups per polymer molecule. The resulting compounds were measured for green strength. The results are given in Table 4.

TABLE 4

| Sample Reference No. | 11 | 12 | 13 |
|---|---|---|---|
| Tertiary amine group content (millimoles) | 5 | 5 | 5 |
| Dibromopolybutadiene (phr) | — | 3.0 | 6.0 |
| Allylic bromine groups in dibromo polybutadiene (millimoles) | — | 3 | 6 |
| 100% modulus (Kg/cm²) | 4.8 | 6.0 | 7.6 |
| 200% modulus (Kg/cm²) | 4.0 | 6.15 | 9.2 |
| ΔM (%) | −16.7 | +2.5 | +21 |
| Elongation at break(%) | 400 | 510 | 500 |
| Tensile strength at break (Kg/cm²) | 2.7 | 5.5 | 10.8 |

EXAMPLE 6

A nitrile rubber was prepared and re-acted according to the invention, and its green strength properties measured.

A monomer mixture of 67 parts by weight butadiene-1,3, 33 parts by weight acrylonitrile and 0.5 parts by weight dimethylaminoethyl methacrylate was charged to a reactor, and polymerized by free radical emulsion polmerization, catalyzed with a redox system (ferrous formaldehyde sulphoxide). The terpolymer so formed was recovered in the normal way. It was then mixed with 0.3 parts, per 100 parts of rubber, of 1, 4-dibromobutene-2, and compounded on a laboratory

TABLE 3

| Rubber | D | A | A | A | A | A | A | A | A |
|---|---|---|---|---|---|---|---|---|---|
| Parts 1,4-dibromo-butene-2 | — | — | 0.1 | 0.15 | 0.2 | 0.3 | 0.45 | — | — |
| Parts α,α'- dibromo-p-xylene | — | — | — | — | — | — | — | 0.123 | 0.185 |
| Tensile after 25' cure (Kg/cm²) | 215 | 210 | 238 | 235 | 218 | 230 | 206 | 222 | 224 |
| Tensile after 50' cure (Kg/cm²) | 226 | 215 | 235 | 230 | 213 | 215 | 217 | 224 | 225 |
| Elongation after 25' cure(%) | 596 | 670 | 590 | 530 | 480 | 520 | 460 | 530 | 520 |
| Elongation after 50' cure(%) | 525 | 530 | 500 | 480 | 450 | 460 | 440 | 500 | 480 |
| 300% Modulus after 25' cure(kg/cm²) | 93 | 75 | 105 | 115 | 125 | 115 | 120 | 111 | 110 |
| 300% Modulus after 50' cure(Kg/cm²) | 117 | 100 | 120 | 120 | 127 | 130 | 134 | 115 | 121 |
| Shore A-2 hardness after 25' cure | 56.5 | — | 55.0 | — | 54.0 | — | 53.0 | 54.0 | 55.0 |
| Shore A-2 hardness after 50' cure | 57.5 | — | 58.0 | — | 57.0 | — | 58.0 | 54.0 | 56.0 |

These results show that the vulcanizate properties of the compositions of this invention are not substantially different from the vulcanizate properties of a polymer of the prior art.

EXAMPLE 5

A rubbery terpolymer of butadiene (approximately 71 parts), styrene (approximately 28 parts) and dimethylaminoethyl methacrylate (5 millimoles) was prepared as described in Example 1, and divided into three portions. The rubber was not oil extended. It had a Mooney (ML4) of 57. The portions were each compounded on a laboratory mill using the recipe of Example 1, except that instead of 1,4-dibromobutene -2, variable amounts of dibromopolybutadiene, of molecumill, using the compounding recipe detailed in Example 1 except for reduction of the amount of stearic acid to 0.5 parts. The compound was tested for green stress/strain properties at room temperature in an instron tester, at a jaw separation rate of 50 cm per minute. The compound was found to have a 100% modulus of 12.0 Kgs. per square cm, and a 200% modulus of 13.8 Kg. per sq. cm., its value of ΔM therefore being 15%. It had an elongation at break of 980%, and a tensile strength at break of 7.5 Kg. per sq.cm. This compares with a regular, standard nitrile rubber containing 67 parts by weight of butadiene - 1,3 and 33 parts by weight of acrylonitrile, and no amino third monomer, which was compounded in the same way and tested in the same way, and found to have a 100% modulus of 7.2 kg. per sq. cm., and a 200% modulus of 6.0 kg. per sq. cm. thereby having a ΔM of −16.7%. This control sample had an elongation at break of 550% and a tensile strength at break of 3.5 kg. per sq. cm.

What is claimed is:

1. A synthetic rubber composition having improved green strength comprising the reaction product of (A) a rubbery polymer of a $C_4 - C_6$ conjugated diolefin and a copolymerizable monomer having a tertiary amine group in the monomer in sufficient amount to provide along the polymer chain from about 0.5 to about 10 millimoles of tertiary amine groups per 100 grams of polymer, with (B) a halogen containing organo compound in sufficient amount to provide from 0.1 to 10 millimoles of halogen groups per 100 grams of polymer containing two or more halogen groups capable of forming quaternary ammonium salts with said tertiary amine groups, said composition being characterized by a change in modulus in the green state from 100% extension to 200% extension of not less than −10% and an elongation to break in the green state of not less than 250%.

2. The composition of claim 1 characterized by a change in modulus in the green state from 100% extension to 200% extension of from −5 to +15%.

3. The composition of claim 1 wherein the halogen compound is a dihalo compound in which the halogen groups are activated by an adjacent chemical grouping.

4. The composition of claim 3 wherein said halogen compound is selected from the group consisting of 1,4-dibromobutene-2, 1,4-dichlorobutene-2, α,α′-dibromo-p-xylene, α,α′-dichloro-p-xylene, liquid dibromopolybutadiene having bound allylic bromide groups and mixtures thereof.

5. The composition of claim 1 which also contains rubbery polybutadiene.

6. The composition of claim 1 wherein the rubbery polymer is a copolymer of a $C_4 - C_6$ conjugated diolefin and dimethylaminoethyl methacrylate, said copolymer containing from about 1 to about 5 millimoles per 100 grams of copolymer of bound tertiary amine groups.

7. The composition of claim 1 wherein the rubbery polymer is a copolymer of a $C_4 - C_6$ conjugated diolefin, a $C_8 - C_{10}$ vinyl or vinylidene substituted aromatic hydrocarbon or a $C_3 - C_5$ vinyl compound containing a nitrile group and dimethylaminoethyl methacrylate, said copolymer containing from about 1 to about 5 millimoles per 100 grams of copolymer of bound tertiary amine groups.

8. A synthetic rubber composition having improved green strength comprising the reaction product of (A) a rubbery copolymer of butadiene, styrene and dimethylaminoethyl methacrylate having a bound butadiene content of 60 to 85 weight percent and a bound dimethylaminoethyl methacrylate content sufficient to provide from 1 to 5 millimoles of tertiary amine groups per 100 grams of copolymer, with (B) a halogen containing organo compound selected from the group consisting of 1,4-dibromobutene-2, 1,4-dichlorobutene-2, α,α′-dibromo-p-xylene, α,α′-dichloro-p-xylene, liquid dibromopolybutadiene or mixtures thereof, the amount of halogen compound being sufficient to provide from 1 to 5 millimoles of halogen groups per 100 grams of copolymer, the composition being characterized by a change in modulus in the green state from 100% extension to 200% extension of from −5 to +15% and an elongation to break in the green state of not less than 250%.

9. A synthetic rubber composition having improved green strength comprising the reaction product of (A) a rubbery copolymer of butadiene, acrylonitrile and dimethylaminoethyl methacrylate having a bound butadiene content of from 50 to 80 weight percent and a bound dimethylaminoethyl methacrylate content sufficient to provide from 1 to 5 millimoles of tertiary amine groups per 100 grams of copolymer, with (B) a halogen containing organo compound selected from the group consisting of 1,4-dibromobutene-2, 1,4-dichlorobutene-2, α,α′-dibromo-p-xylene, α,α′-dichloro-p-xylene, liquid dibromopolybutadiene or mixtures thereof, the amount of halogen compound being sufficient to provide from 1 to 5 millimoles of halogen groups per 100 grams of copolymer, the composition being characterized by a change in modulus in the green state from 100% extension to 200% extension of from −5 to +15% and an elongation to break in the green state of not less than 250%.

10. A process of preparing synthetic rubber compositions having improved green strength which comprises reacting a halogen containing organo compound with a rubbery polymer of a $C_4 - C_6$ conjugated diolefin and a copolymerizable monomer having a tertiary amine group in the monomer in sufficient amount to provide along the polymer chain from about 0.5 to 10 millimoles of tertiary amine groups per 100 grams of polymer, said halogen compound containing two or more halogen atoms capable of forming quaternary ammonium salts with said tertiary amine groups and being present in sufficient amount to provide from 0.1 to 10 millimoles of halogen groups per 100 grams of polymer.

11. The process of claim 10 wherein the rubbery polymer is a copolymer of butadiene, one of styrene or acrylonitrile and dimethylaminoethyl methacrylate.

12. The process of claim 11 wherein the halogen compound is added to the rubbery polymer while said rubbery polymer is in latex form.

13. The process of claim 11 wherein the halogen compound is reacted with the rubbery polymer on a rubber mill or in an internal mixer.

14. The process of claim 13 in which the rubbery polymer is being mixed with compounding ingredients.

* * * * *